(12) United States Patent
Fugate et al.

(10) Patent No.: US 10,997,060 B2
(45) Date of Patent: May 4, 2021

(54) DEVICE, SYSTEM, AND METHOD FOR DETECTING A DEFECT IN A COMPUTER PROGRAM BY GENERATING AND TESTING SEMANTICALLY EQUIVALENT COMPUTER PROGRAM VARIANTS

(71) Applicant: Naval Information Warfare Center, Pacific, San Diego, CA (US)

(72) Inventors: Sunny J. Fugate, San Diego, CA (US); Jason A. Landsborough, San Diego, CA (US); Stephen T. Harding, San Diego, CA (US); Charles L. Carpenter, Chula Vista, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/408,183

(22) Filed: May 9, 2019

(65) Prior Publication Data
US 2020/0356468 A1 Nov. 12, 2020

(51) Int. Cl.
*G06F 9/44* (2018.01)
*G06F 11/36* (2006.01)
(52) U.S. Cl.
CPC ...... *G06F 11/3688* (2013.01); *G06F 11/3684* (2013.01)
(58) Field of Classification Search
CPC .......................... G06F 11/3684; G06F 11/3688
USPC ................................................. 717/124–133
See application file for complete search history.

(56) References Cited

U.S. PATENT DOCUMENTS

| | | | | |
|---|---|---|---|---|
| 7,835,264 B2* | 11/2010 | Ochiai | ............. | H03M 13/2703 370/208 |
| 8,381,192 B1 | 2/2013 | Drewry et al. | | |
| 8,943,354 B2* | 1/2015 | Canini | .................. | G06F 11/006 714/4.1 |
| 9,130,814 B2* | 9/2015 | Petrov | ................ | H03M 13/1165 |
| 9,619,375 B2* | 4/2017 | Avgerinos | ........... | G06F 11/3688 |
| 2008/0301647 A1 | 12/2008 | Neystadt et al. | | |
| 2008/0301813 A1 | 12/2008 | Neystadt et al. | | |
| 2009/0164975 A1 | 6/2009 | Natanov et al. | | |
| 2014/0109228 A1 | 4/2014 | Kalman et al. | | |
| 2015/0026669 A1 | 1/2015 | Eddington et al. | | |

OTHER PUBLICATIONS

Le et al., "Compiler Validation via Equivalence Modulo Inputs", 2014, ACM, pp. 216-226. (Year: 2014).*
MATLAB & Simulink, "Interleaving", 2017, retreived from hhttps://web.archive.org/web/20170529165250/http://www.mathworks.com/help/comm/ug/interleaving.html#, 8 pages. (Year: 2017).*
Narayanan et al., "A Systematic Approach to Automatically Generate Multiple Semantically Equivalent Program Versions", Proceedings of 13th Ada-Europe International Conference on Reliable Software Technologies, Venice, Italy, Jun. 16-20, 2008.
Juho Myllylahti, "Incorporating Fuzz Testing to Unit Testing Regime", University of Oulu Department of Information Processing Science Master's Thesis, Nov. 10, 2013.

\* cited by examiner

*Primary Examiner* — Ted T. Vo
(74) *Attorney, Agent, or Firm* — Naval Information Warfare Center, Pacific; Kyle Eppele; James R. McGee

(57) ABSTRACT

Semantically equivalent variants of a computer program are generated by applying randomly selected transforms to the computer program. Unit tests are performed on the variants of the computer program to detect a defect in the computer program.

20 Claims, 8 Drawing Sheets

NOP Insertion

DEVICE, SYSTEM, AND METHOD FOR DETECTING A DEFECT IN A COMPUTER PROGRAM BY GENERATING AND TESTING SEMANTICALLY EQUIVALENT COMPUTER PROGRAM VARIANTS

FEDERALLY-SPONSORED RESEARCH AND DEVELOPMENT

The United States Government has ownership rights in this invention. Licensing inquiries may be directed to Office of Research and Technical Applications, Naval Information Warfare Center, Pacific, Code 72120, San Diego, Calif., 92152; telephone (619) 553-5118; email: ssc pac t2@navy.mil, referencing NC 103939.

FIELD OF THE INVENTION

The present disclosure pertains generally to detecting a defect in a computer program. More particularly, the present disclosure pertains to detecting defect in a computer program by generating and testing semantically equivalent variants of the computer program.

BACKGROUND

To avoid certain types of security vulnerabilities, developers of computer programs should verify that consumed input is well-formed, without making false assumptions about input consistency. Otherwise, defects, such as buffer overruns resulting from malformed input, and other types of errors, may be fatal to proper functioning and results of the computer program. To locate any such defects, software developers often implement computer program testing prior to releasing software.

There are various techniques for detecting software defects. Some of these defects are able to be discovered through syntactic validation. Other defects can be discovered through semantic validation. Still other defects may be discovered through dynamic analysis. Other defects are discovered through rigorous testing of executing computer programs using techniques such as "fuzz testing".

Fuzz testing is a software testing technique that typically provides random test variables (referred to as "fuzz") as inputs. A fuzz tester executes the computer program using random test variables. If the computer program fails the test by providing a faulty response, such as crashing or by failing built-in code assertions, such a failure is noted by a software developer who attempts to address the defects.

Conventional software fuzz testing techniques are typically very time consuming and labor intensive, often requiring iterative manual effort and/or use of inefficient automated techniques. Also, existing fuzz testing techniques generally only locate very specific and simple faults, often with poor code coverage. For example, if an input includes a checksum which is not properly updated to match other random changes, only the checksum validation code will be verified. Additionally, traditional fuzz testing may not uncover timing related defects or defects which happen to pass even though the computer program may be semantically invalid or otherwise defective.

In view of the above, it would be desirable to have an efficient and reliable technique for detecting defects in a computer program that are not detectable using existing testing techniques.

SUMMARY

According to an illustrative embodiment, semantically equivalent variants of a computer program are generated by applying randomly selected transforms to the computer program. Unit tests are performed on the variants of the computer program to detect a defect in the computer program.

These, as well as other objects, features and benefits will now become clear from a review of the following detailed description, the illustrative embodiments, and the accompanying drawings.

BRIEF DESCRIPTION OF THE DRAWINGS

The accompanying drawings, which are incorporated in and form a part of the specification, illustrate example embodiments and, together with the description, serve to explain the principles of the present device, system and method.

DETAILED DESCRIPTION OF THE EMBODIMENTS

According to illustrative embodiments, the concept of fuzz testing is extended by using a technique to detect defects in a computer program that may not otherwise be discoverable. As opposed to traditional software testing techniques, which ensure that the computer program being tested is not tampered with in a way that may cause it to fail, the technique described herein specifically transforms the computer program in order to expose defects which are affected by the transformation. This technique is reliable because the transformations made to the computer program produce semantically equivalent variants of the computer program. That is, the transformations guarantee that the variants of the computer program are valid and perform the same operations as the original computer program.

When a computer program has nonsensical, non-grammatical, semantically invalid statements, or invalid uses of programming constructs, this guarantee may no longer be true. In other words, correct computer programs can be transformed safely to produce semantically equivalent variants, but incorrect computer programs will sometimes fail after transformation.

According to illustrative embodiments, this principle is utilized in order to detect defects which would not otherwise be detectable using traditional testing and validation approaches. This can help prevent defects from being exposed in future software versions by discovering them early.

According to illustrative embodiments, defects in a computer program are detected by generating diverse but semantically equivalent variants of the computer program by applying a series of randomly selected semantic-preserving transforms. The variants of the computer program contain the same features as the original computer program. However, the variants may contain additional instructions, different instructions, or the same instructions in a different location within the computer program. Testing of these variants can uncover unknown or unreachable defects in the computer program. Examples of defects which may be detected include race conditions, use-before-initialization, use-after-free, pointer mis-use, reflection defects, etc.

Figure 1:
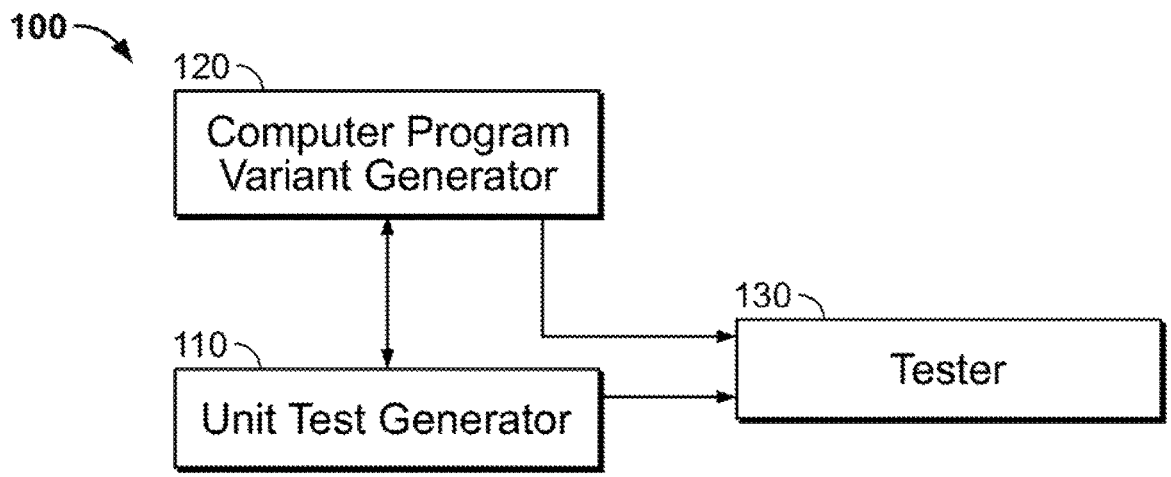
FIG. 1 illustrates a system for detecting a defect in a computer program by generating and testing semantically equivalent variants of the computer program according to an illustrative embodiment.

FIG. 1 illustrates a system for detecting a defect in a computer program by generating and testing semantically equivalent variants of the computer program according to an illustrative embodiment. Referring to FIG. 1, the system 100 includes a unit test generator 110, a computer program variant generator 120, and a tester 130. The unit test generator 110 is configured to generate unit tests. Unit tests are generated by defining units of computer program variants to be tested (such as blocks of code associated with individual functions), defining the test variable inputs and defining the expected test outputs. The unit tests may be generated based on information that is pre-populated or input from a user, such as test variables inputs, expected outputs, and the size of a unit to test. In one example, the test variable inputs to use in a unit test may be selected at random by the unit test generator from among a set of test variable inputs and test variable value ranges. Use of randomly selected inputs and input values for a unit test are also known as 'fuzz tests'. Unit tests and fuzz tests can cover any portion of a computer program, its component functions, or other computer program units, or may be used to test the entire computer program from input to output.

The computer program variant generator 120 is configured to generate semantically equivalent but diverse variants of a computer program by applying a series of randomly selected semantic-preserving transforms to the computer program. The transforms may be pre-populated in the computer program variant generator 120 and/or supplied by a user. Examples of the transforms that may be applied to the computer program by the computer program variant generator 120 are shown in FIGS. 2A-2E, which are described in detail below.

The unit tests generated by the unit test generator 110 and the variants of the computer program generated by the computer program variant generator 120 are provided to a tester 130. The tester 130 is configured to perform the unit tests on the diverse but semantically equivalent variants to detect a defect in the computer program. According to an illustrative embodiment, the tester 130 may be a fuzz tester. However, other testing methodologies may be used.

Using the unit tests generated by the unit test generator 110, the tester 130 separately tests isolated units of the variants of the computer program by executing the variants using the input test variables included in the unit tests and comparing the actual output of the test to the expected output. If the actual test outputs do not match the expected outputs, the variant fails the unit test. Failure of a unit test is an indication that there is a defect in the computer program. In this manner, the tester 130 detects defects in the computer program, based on the results of performing unit tests on variants of the computer program.

The tester 130 may continue to perform the unit tests on the variants of the computer program for a prescribed number of unit tests and/or a prescribed number of computer program variants. The prescribed number of unit tests and the prescribed number of computer program variants may be determined in advance, e.g., by a software tester. The number of unit tests and the number of computer program variants may also be determined by measurements of test coverage. As additional tests are run and as additional variants are tested, code coverage will tend to increase until either all code is covered, a prescribed proportion of the code is covered by the tests, or performing additional tests against additional variants does not increase code coverage above a minimum amount of increase on a per test or per variant prescribed amount.

In one embodiment, a set of unit tests is generated for each variant of the computer program. This may be advantageous if unit test generation and running unit tests are fast compared to variant generation and/or if there is a desire to run a large number of unit tests for each variant. In some cases, unit tests to be performed for each variant may be selected based on the structure of the variant of the computer program and how the variant differs from the original computer program. This selection may be performed by a user in communication with the computer program variant generator 120 and the unit test generator 110 or by the unit test generator 110 in communication with the computer program variant generator 120.

According to one embodiment, the portions of the variant that are different from the original computer program are those that are most important for testing. In some situations, unit tests that do not cover the portions of the variant that are different from the original computer program may be excluded from testing. In other situations, testing portions of the variant which are not different from the original computer program may still be desired or beneficial for detecting computer program defects. One example in which it would still be beneficial to test portions of a computer program which are not modified in a variant would be where the effects of the variant modification are long-range and occur much later in computer program execution. Another example would be where changes in computer program values in one branch will also affect other branches which are not directly modified. In either situation, retaining tests which cover these other computer program regions can be important. This is particularly true in instances of multi-threaded computation with shared state in which two independent branches are reading and writing values simultaneously. Maintaining code coverage of both branches where either branch may have been transformed in variant generation can expose defects in the other, non-modified branch.

In another embodiment, a set of variants or a computer program is generated for each unit test. This may be advantageous if variant generation is fast and/or if unit test generation or running each unit test is expensive. This will also allow variant generation to be specialized based on each unit test, such that the variants that are generated best fit the coverage of the unit test and are most likely to expose defects for a particular unit test. Such specialization of variant generation may be performed by a user in communication with the computer program variant generator 120 and the unit test generator 110 or by the computer program variant generator 120 in communication with the unit test generator 110.

Outputs of the tester 130 may be logged as test results, along with the variants upon which the unit tests are performed. In one embodiment, all the test results and the variants are logged. By logging all the test results and the variants, the test results of both passing and failing variants may be compared to aid in debugging.

In another embodiment, test results and variants are only logged for variants that fail a unit test. Logging only the test results and variants for variants that fail unit tests may make it quicker to parse the log file to find computer program defects.

Additional information may also be logged during each test, such as the specific computer program instructions and branches which are covered by the test. In this way, the logged data can be used to guide test coverage including test generation and variant generation.

Figure 2A:
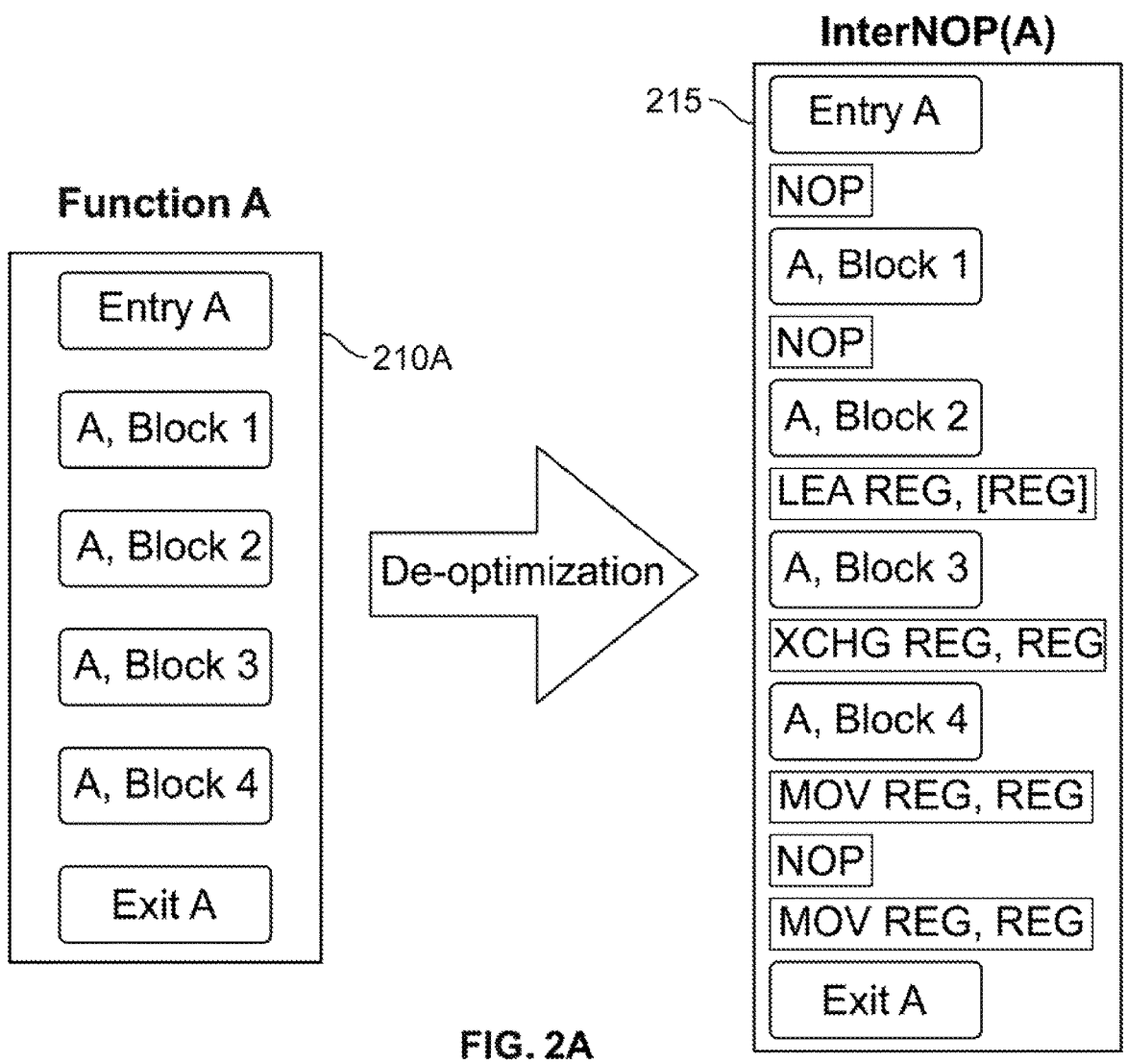
FIGS. 2A-2E illustrate examples of randomly selected transformations applied to a computer program to generate semantically equivalent variants of the computer program according to illustrative embodiments.

Turning now to an explanation of how variants of the computer program may be generated, reference is first made to FIG. 2A. In FIG. 2A, a portion 210A of a computer program containing blocks of code associated with a function A is transformed by inserting computer instructions that specify no operation (NOP) into the portion 210A. The result is a variant of the computer program which includes a de-optimized portion 215 which increases the time taken to perform the specific set of instructions which are transformed. When the de-optimized portion 215 of the variant is tested, the inserted computer instructions are expected not to affect the output. Thus, if the output produced by testing the variant including the de-optimized portion 215 is not the expected output, this is an indication that there is a defect in the portion 210A of the computer program.

Figure 2B:
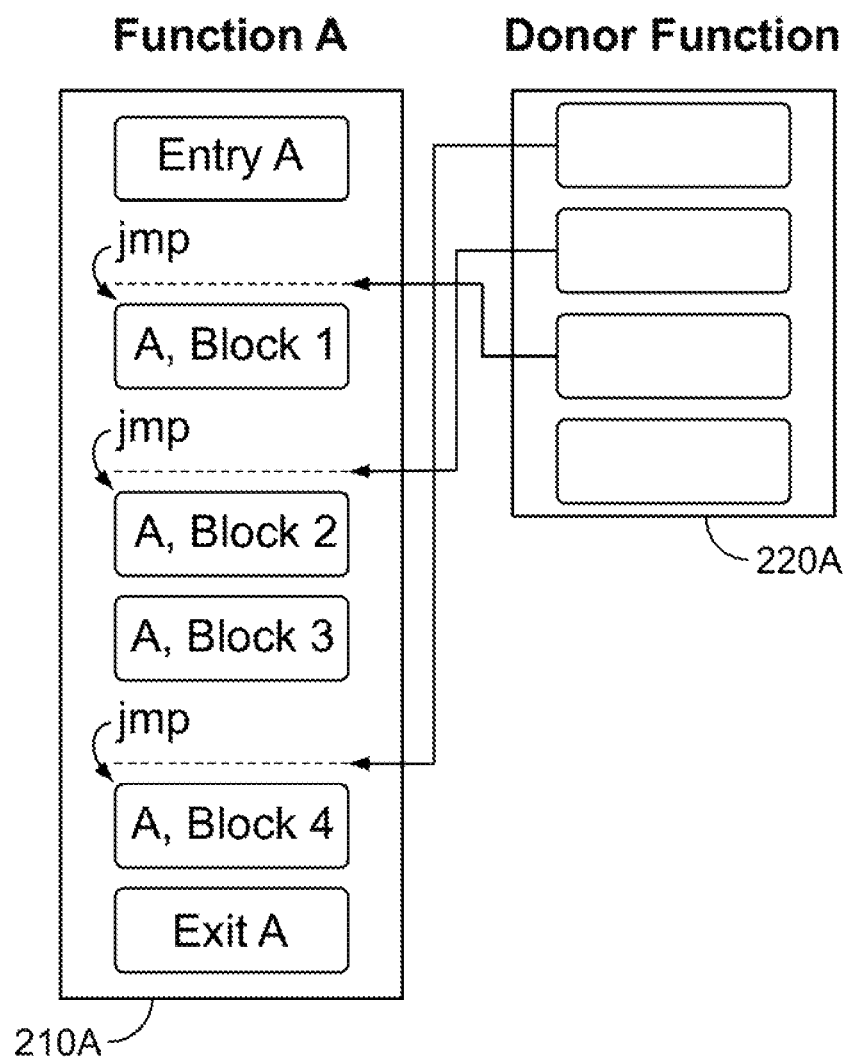

Referring to FIG. 2B, another transformation involves code donation. As shown in FIG. 2B, the portion 210A of the computer program containing blocks of code associated with the function A is transformed by inserting blocks of code that have no functionality from a portion 220A of the same computer program (or another computer program), with jumps inserted to the appropriate blocks. The result is a variant including donated code. When the variant is tested, the donated code is expected to be ignored, as the small donated sections of code would be jumped over. Thus, if the output produced by testing the variant including the portion 220A is not the expected output, this is an indication that there is a defect in the portion 210A of the computer program or a defect in a region of the computer program which directly or indirectly references code in the portion 210A in an unsafe way, such as a 'goto' or other use of hardcoded addresses or offsets.

Figure 2C:
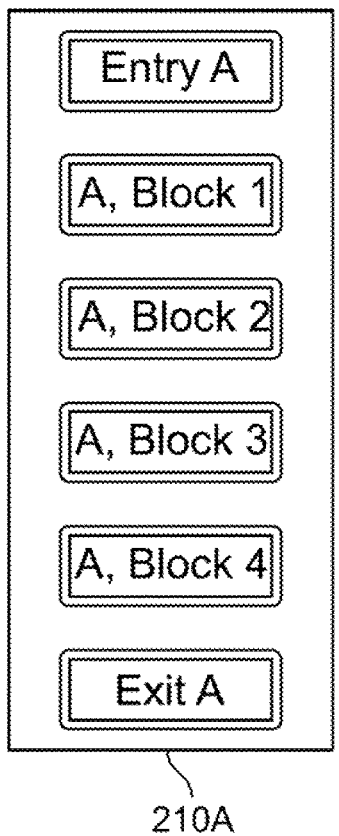
Figure 2C:
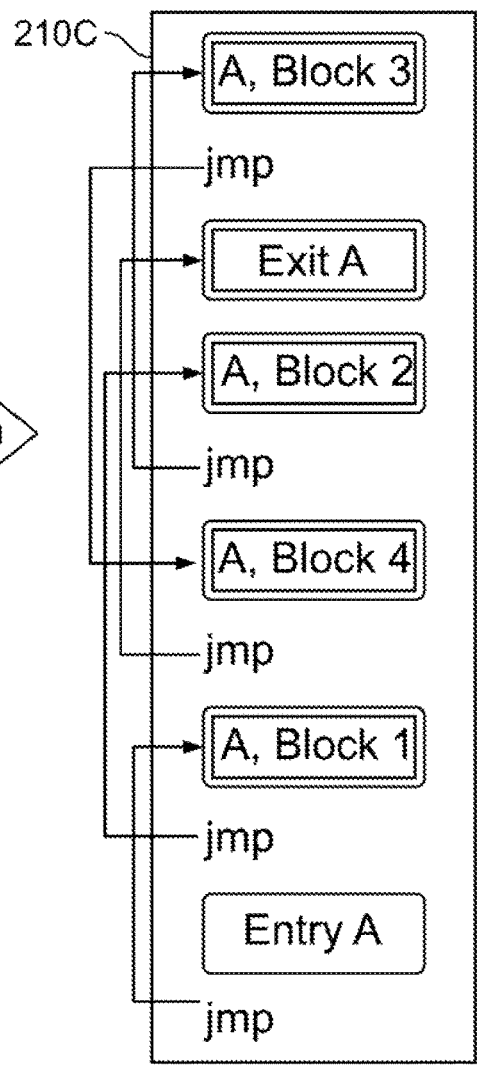

Referring to FIG. 2C, another transformation involves shuffling blocks of code of a computer program. As shown in FIG. 2C, independent blocks of code of the portion 210A of the computer program associated with the function A are shifted, with jumps inserted to jump to the appropriate blocks, resulting in a variant that includes a de-optimized portion 210C. Though the variant has reordered functionality, such reordering is not expected to affect the output during testing. Thus, if the output produced by testing the variant including the de-optimized portion 210C is not the expected output, this is an indication that there is a defect in the portion 210A of the computer program.

Figure 2D:
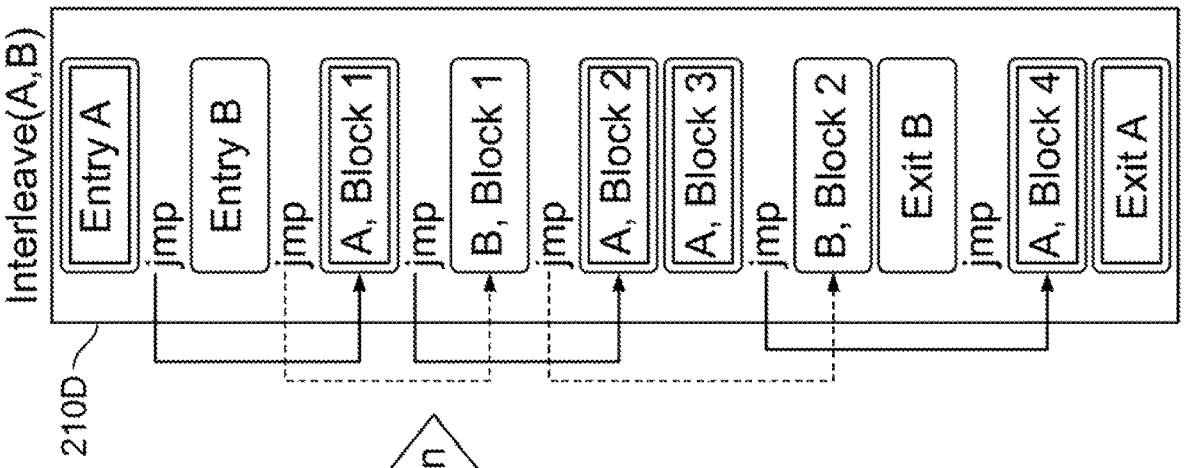
Figure 2D:
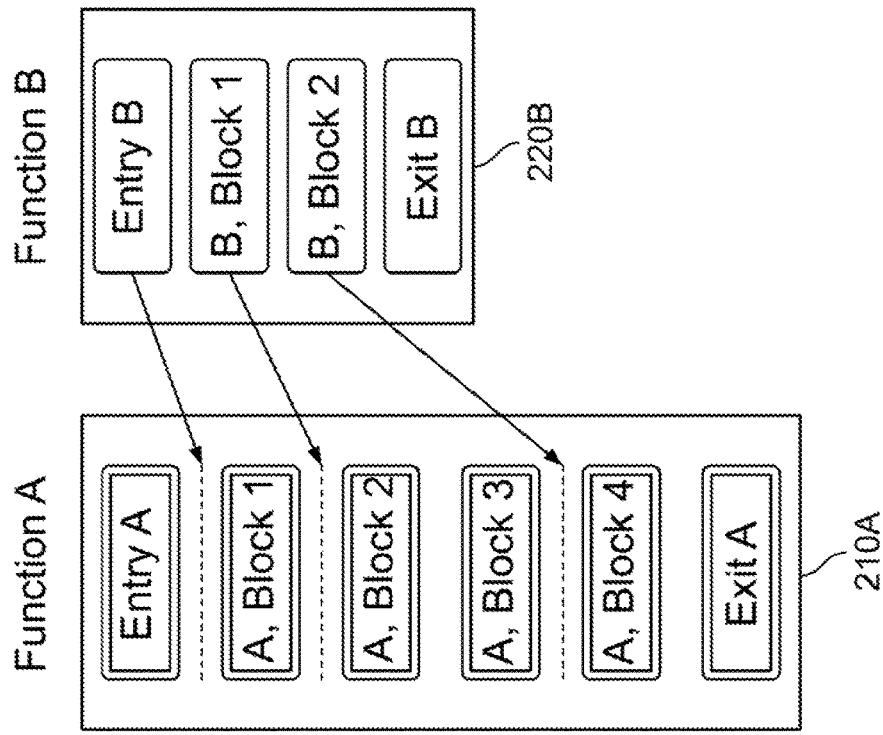

Referring to FIG. 2D, another transformation involves interleaving blocks of code of a computer program. As shown in FIG. 2D, independent blocks of code of portion 210A of a computer program associated with the function A are interleaved with independent blocks of code of a portion 220B of a computer program associated with a function B. This results in a variant including a de-optimized portion 210D with functions A and B merged together. Independent blocks from both functions are combined into a larger collection of blocks, with jumps inserted to jump to the appropriate blocks. The result of executing the variant including the de-optimized portion 210D is expected to include outputs for functions A and B. If the output produced by testing the variant including the portion 210D is not the expected output, for example, if the output does not include the expected output for function A, this is an indication that there is a defect in the portion 210A of the computer program.

In one embodiment, the interleaved blocks of code of the de-optimized portion 210D of the variant can include a self-contained function call which, when executed, would cause a computation to be performed that would not be expected to affect the output. For example, a function call may be interleaved into the portion which, when executed, performs a high-cost computation, such as initializing an array of randomly generated values, sorting this array using an inefficient algorithm and then returning to the caller after which the caller will continue execution. This greatly affects the runtime. When the variant with the interleaved function call is tested, the results can expose race conditions and deadlock conditions in the portion 210A of the computer program which would not otherwise be exposed.

Use of an interleaved function call may be desirable in instances where the same interleaved function call can be used in many different locations in the transformed computer program. The interleaved function call can also be configured to take parameters when it is called which can be used to affect how the interleaved function call performs its computation, the time it takes to perform its computation, or the portions of the computing device which are affected by its computation (such as the set of registers that should be affected, specific memory regions that should be overwritten or affected, or global variables that should be modified during execution of the inserted function call).

Figure 2E:
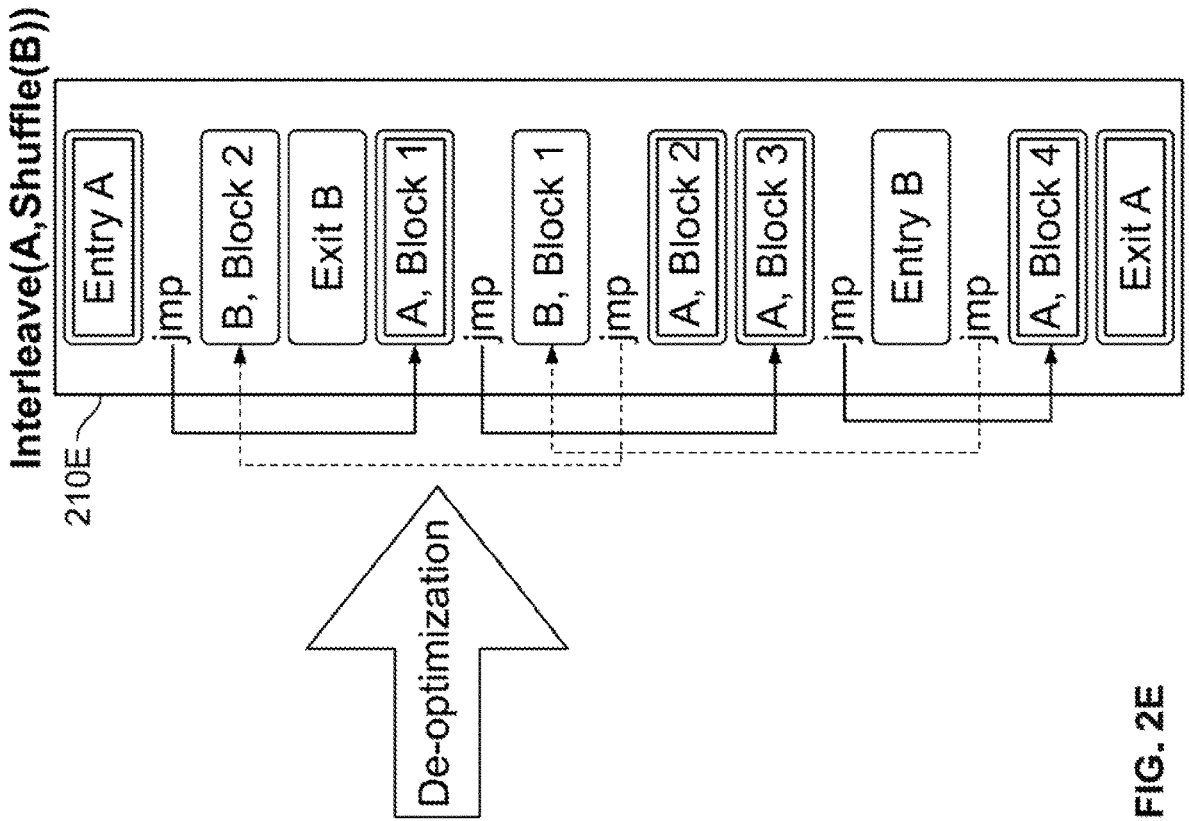
Figure 2E:
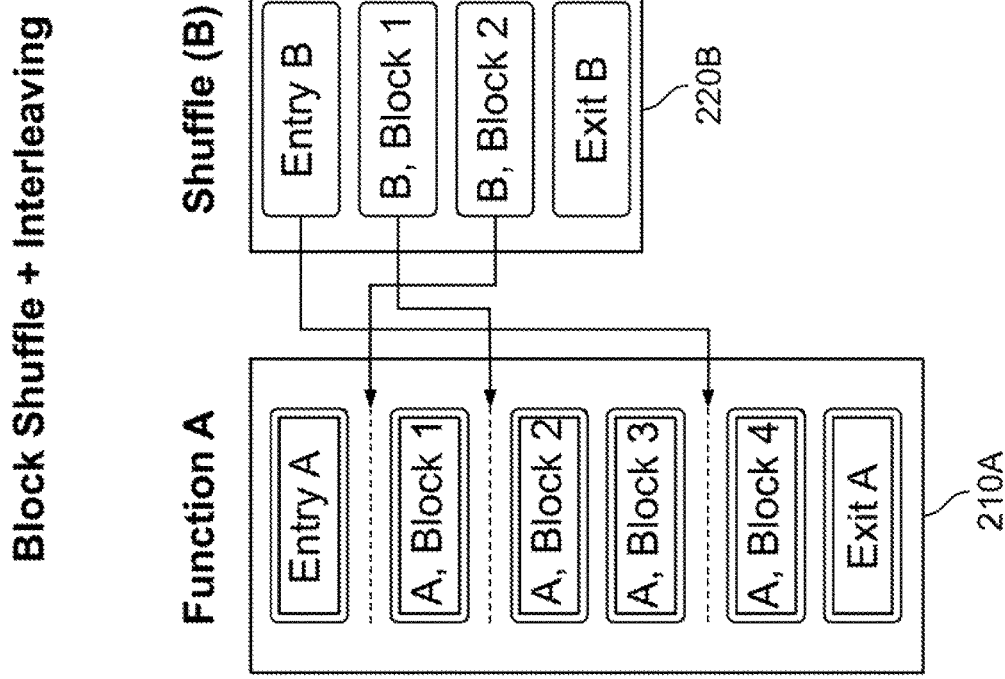

Referring to FIG. 2E, another transformation involves a combination of the independent block shuffling and independent block interleaving approaches. Here, the independent blocks of code of portion 210A of the computer program associated with the function A and the independent blocks of code of a portion 220B of the computer program associated with the function B are shuffled and combined, with jumps inserted to the appropriate blocks. This results in a de-optimized portion 210E of a variant with blocks associated with the functions A and B. The result of executing the variant including the portion 210E is expected to include the outputs for functions A and B. If the output produced by testing the variant including the portion 210E is not the expected output, for example, if the output does not include the expected output for function A, this is an indication that there is a defect in the portion 210A of the computer program.

To illustrate how a defect of a computer program may be detected by testing a variant of the computer program, consider the computer program "Undefined" that follows.

```
// Undefined
#include <stdio.h>
void populateBuff( ) {
    int buff[10];
    int i;
    for (i = 0; i < 10; ++i) buff[i] = i;
}
void printBuff( ) {
    int buff[10];
    int i;
    for (i =0; i < 10; ++i) printf("%d\n", buff[i]);
}
int main( ) {
    int buff[10];
    populateBuff( );
    printBuff( );
```

```
        printf("debug ... \n");
        return 0;
}
```

This computer program contains a defect in that a buffer is populated within the scope of a local function "populateBuff( )", and then an attempt is made to use the buffer in another function "printBuff( )". This defect would not be detected by normal testing of the computer program, as the populated data would exist in the stack when the printBuff( ) function is executed even though the data is at a memory location that is no longer valid and will be used in the next stack frame.

However, consider a variant of the computer program "Printf_undefined" that follows.

```
// Printf_undefined
#include <stdio.h>
void populateBuff( ) {
    int buff[10];
    int i;
    for (i = 0; i < 10; ++i) buff[i] = i;
}
void printBuff( ) {
    int buff[10];
    int i;
    for (i = 0; i < 10; ++i) printf("%d\n", buff[i]);
}
int main( ) {
    int buff[10];
    populateBuff( );
    printf("debug ... \n");
    printBuff( );
    return 0;
}
```

Figure 3:
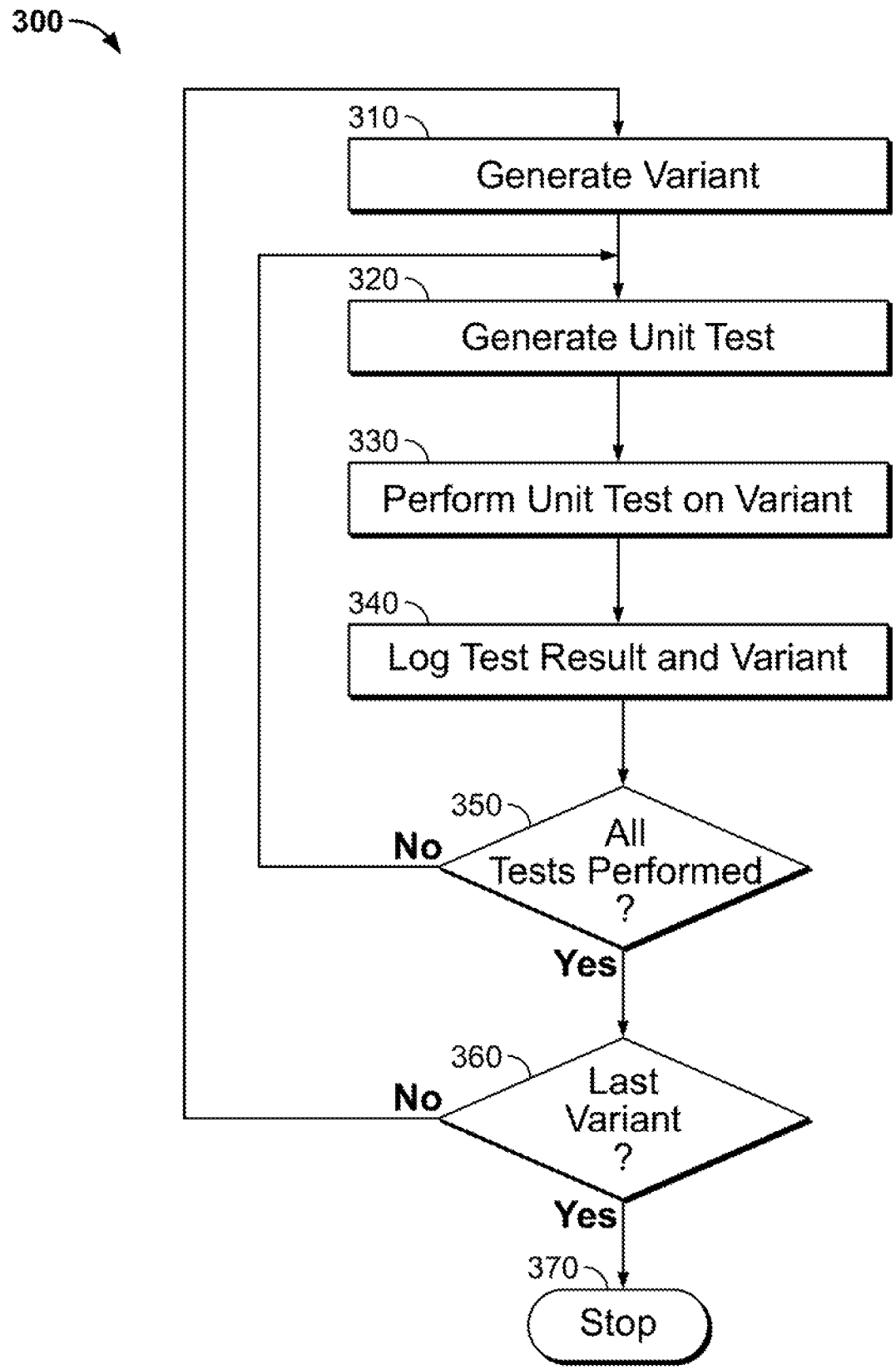
FIG. 3 is a flow chart depicting a method for detecting a defect in a computer program by generating and testing semantically equivalent variants of the computer program according to an illustrative embodiment.

In the variant "Printf_undefined", the 'printf' function is shuffled so that it is executed between the 'populateBuff( )' function and the 'printBuff( )' function. By doing so, the content of the stack is overwritten by the 'print' call such that execution of the 'printBuff( )' function results in printing garbage. As can be seen from this example, a defect in the computer program which would not be detected during normal testing of the computer program is detected using a variant of the computer program FIG. 3 is a flow chart showing steps of a method for detecting a defect in a computer program according to an illustrative embodiment. Referring to FIG. 3, the method 300 begins at step 310 at which a semantically equivalent variant of a computer program is generated by applying a randomly selected transform to the computer program. At step 320, a unit test for testing the variant of the computer program is generated. At step 330, the unit test is performed on the variant of the computer program. A failure of the unit test by the variant represents a defect in the computer program.

At step 340, the test result and the variant upon which the unit test is performed are logged. At step 350, a determination is made whether all the unit tests of a prescribed number of unit tests have been performed. If all the unit tests have not been performed, the process 300 returns to step 320, and another unit test is generated.

If all the unit tests have been performed, a determination is made at step 360 whether all the variants of a prescribed number of variants have been tested. If all the variants of the prescribed number of variants have not been tested, the method returns to step 310, and a new variant is generated. Once all the variants have been tested using the unit tests, the method ends at step 370.

In the method 300 depicted in FIG. 3, a set of unit tests is generated for each variant. As discussed above, according to another embodiment, a set of variants may be generated for each unit test. This may be understood with reference to FIG. 4 which is a flow chart showing steps of a method for detecting a defect in a computer program according to another illustrative embodiment.

Figure 4:
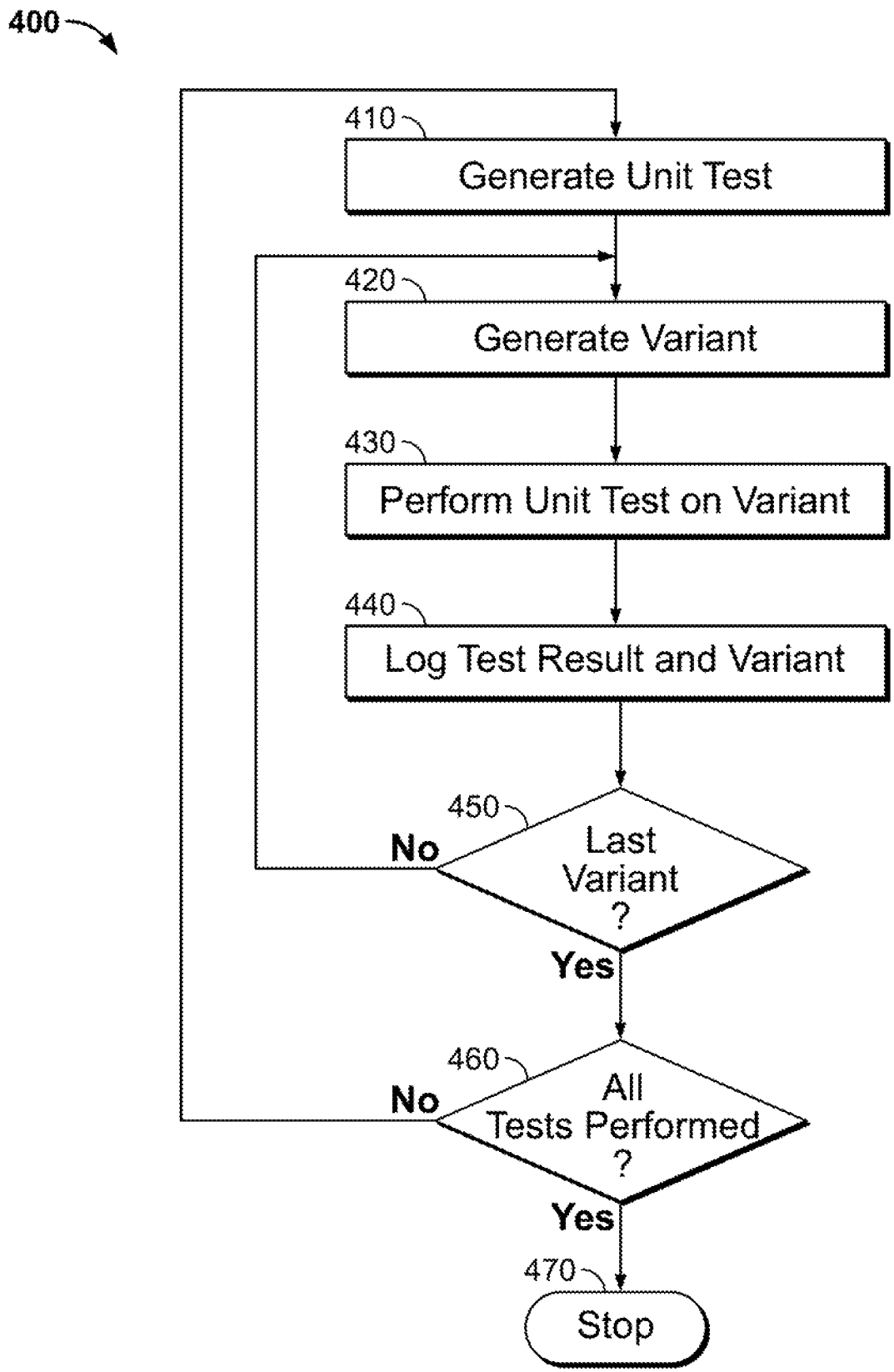
FIG. 4 is a flow chart depicting a method for detecting a defect in a computer program by generating and testing semantically equivalent variants of the computer program according to another illustrative embodiment.

Referring to FIG. 4, the method 400 begins at step 410 at which a unit test is generated. At step 420, a semantically equivalent variant of a computer program is generated by applying a randomly selected transform to the computer program. At step 430, the unit test is performed on the variant of the computer program. A failure of the unit test by the variant represents a defect in the computer program.

At step 440, the test result and the variant upon which the unit test is performed are logged. At step 450, a determination is made whether all the variants of a prescribed number of variants have been tested using the unit test. If all the variants have not been tested using the unit test, the method 400 returns to step 420, and another variant is generated. If all the variants have been tested using the unit test, a determination is made at step 460 whether all the unit tests of a prescribed number of unit test have been performed. If all the unit tests have not been performed, the process 400 returns to step 410, and a new unit test is generated. Once all the unit tests have been performed on the variants, the method ends at step 470.

It should be appreciated that fewer, additional, or alternative steps may also be involved in the methods 300 and 400 and/or some steps may occur in a different order. For example, although not shown, it should be appreciated that the methods 300 and 400 may each include a step for determining whether a variant fails a unit test, and the test result and the variant may only be logged if the variant fails the unit test.

Additionally, it should be appreciated that the steps used to create a variant of a computer program (steps 310 and 420) can include the processing of source code decorators which may be added by a developer to direct which specific transforms are applied (or not applied) to a particular region of the computer program. These custom decorators may be added by a software developer to the source code of the original computer program directly. During the variant generation steps 310 and 420, the decorators can indicate a desire to limit or restrict the application of transforms to specific regions of the computer program. One reason for restricting these transforms may be because a region of code is known to have a defect or to be brittle but has required functionality and cannot be fixed. An example of such a defect would be a race condition. The regions of code indicated by the decorators may also affect the performance of fuzz tests. The decorators can provide limits as to which regions of code are transformed and also control the specific transforms or types of transforms which are applied to these regions. Similarly, these same decorators could indicate particular regions of the computer program to which a larger number or greater diversity of random transforms should be applied. In a similar fashion, decorators can also be used to direct the tester 130 to perform additional fuzz testing of regions with particular decorators (providing better code coverage of these regions) or to suppress fuzz testing of these regions depending on the decorator used.

Figure 5:
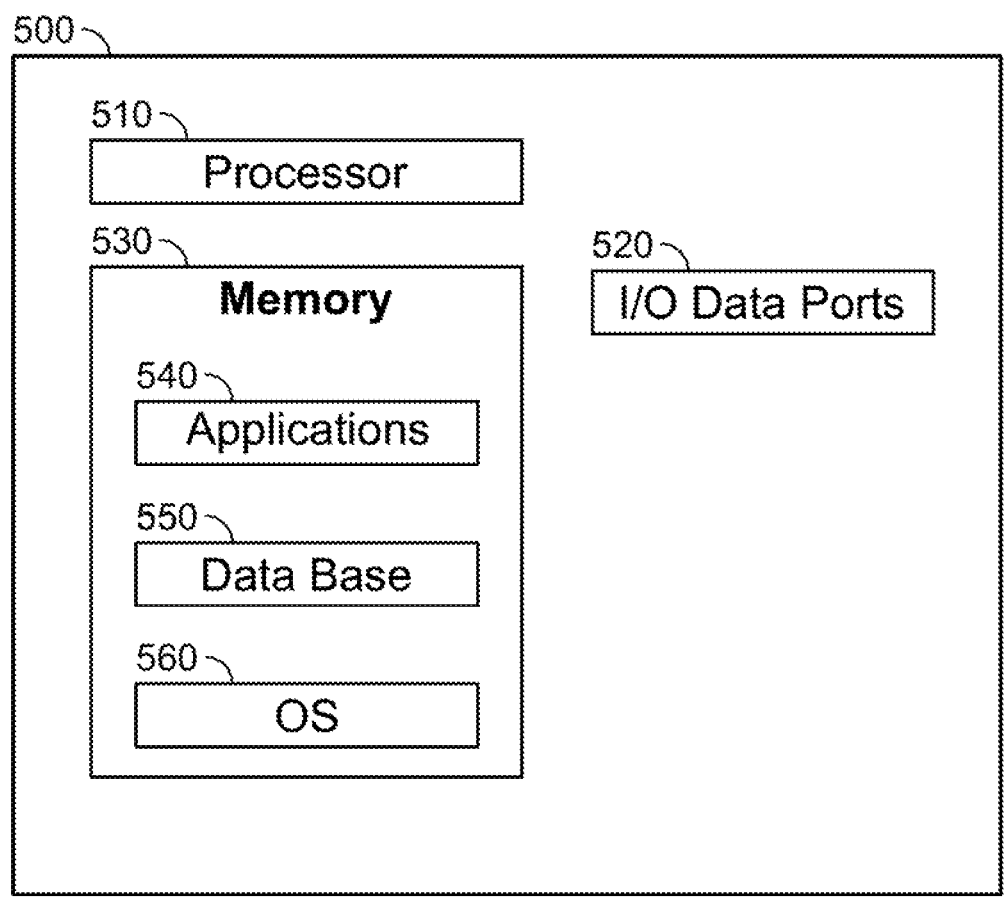
FIG. 5 is a block diagram of a computing device with which various components of the system shown in FIG. 4 may be implemented according to an illustrative embodiment.

FIG. 5 is a block diagram of a computing device 500 with which various components of the system 100, including the unit test generator 110, the computer program variant generator 120, and the tester 130 may be implemented according to an illustrative embodiment. The unit test generator 110, the computer program variant generator 120, and the tester 130 may be implemented in the same computing device or in different computing devices. Although no connections are shown between the components illustrated in FIG. 5, those skilled in the art will appreciate that the components can interact with each other via any suitable connections to carry out device functions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media" and variants thereof, as used in the specification and claims, includes non-transitory storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed.

Referring to FIG. 5, the computing device 500 includes a processor 510 that receives inputs and transmits outputs via input/output (I/O) Data Ports 520. The I/O Data Ports 520 can be implemented with, e.g., any suitable interface through which data may be received and transmitted wired and/or wirelessly. For example, in the case of the unit test generator 110 shown in FIG. 1, the inputs may include input test variables, expected outputs, a definition of a unit, and a prescribed number of unit test to be performed, and the outputs may include unit tests to be performed by the tester 130. In the case of the computer program variant generator 120, the inputs may include the computer program to be tested, and the prescribed number of variants to be generate, and the outputs may include variants to be tested by the tester 130. In the case of the tester 130, the inputs may include the unit tests and the variants, and the outputs may include logged test results and variants.

Although not shown, the computing device 500 may also include a physical hard disk drive, solid state drive, EEPROM, flash memory storage, or other form of non-volatile memory storage device. The processor 510 communicates with the memory 530 and the hard drive via, e.g., an address/data bus (not shown). The processor 510 can be any commercially available or custom microprocessor. The memory 530 is representative of the overall hierarchy of memory devices containing the software and data used to implement the functionality of the computing device 500. The memory 530 can include, but is not limited to, the types of memory devices described above. As shown in FIG. 5, the memory 530 may include several categories of software and data used in the computing device 500, including applications 540, a database 550, an operating system (OS) 560, etc.

The applications 540 can be stored in the memory 530 and/or in a firmware (not shown) as executable instructions and can be executed by the processor 510. The applications 540 include various programs that implement the various features of the computing device 500. For example, in the case of the unit test generator 110 shown in FIG. 1, the applications 540 may include applications to generate the unit tests. In the case of the computer program variant generator 120, the applications 540 may include applications to generate the variants of the computer program. In the case of the tester 130, the applications 540 may include applications to perform the unit tests on the variants.

The database 550 represents the static and dynamic data used by the applications 540, the operating system (OS) 560, and other software programs that may reside in the memory. The database 550 may be used to store various data including data needed to execute the applications 540. For example, in the case of the unit test generator 110 shown in FIG. 1, the database 550 may store, e.g., an indication of the prescribed number of unit tests to be generated, definitions of units, etc. In the case of the computer program variant generator 120, the database 550 may store, e.g. an indication of the prescribed number of variants to be generated, transformations to be applied, etc.

While the memory 530 is illustrated as residing proximate the processor 510, it should be understood that at least a portion of the memory 530 can be a remotely accessed storage system, for example, a server on a communication network, a remote hard disk drive, a removable storage medium, combinations thereof, and the like.

It should be understood that FIG. 5 and the description above are intended to provide a brief, general description of a suitable environment in which the various aspects of some embodiments of the present disclosure can be implemented. While the description includes a general context of computer-executable instructions, the present disclosure can also be implemented in combination with other program modules and/or as a combination of hardware and software in addition to, or instead of, computer readable instructions.

Further, although FIG. 5 shows an example of how a computing device 500 with which components of the system 100 may be implemented, those skilled in the art will appreciate that there may be other computer system configurations, including, for example, multiprocessors, parallel processors, virtual processors, distributed computing systems, microprocessors, mainframe computers, and the like.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A computing device, comprising:
a processor; and
a memory having a plurality of instructions stored thereon which, executed by the processor, cause the processor to generate semantically equivalent variants of a computer program by applying randomly selected transforms to the computer program, each of the variants including at least one respective instruction modified from the computer program, and further cause the processor to perform unit tests on the variants of the computer program to detect a defect in the computer program, including the processor executing the at least one respective instruction modified in each of the variants.

2. The computing device of claim 1, wherein a randomly selected transform applied to the computer program includes for one or more of the variants inserting the respective instruction that specifies no operation into the computer program or inserting the at least one respective instruction, which is a plurality of instructions that has no functionality, into the computer program.

3. The computing device of claim 1, wherein a randomly selected transform applied to the computer program includes for at least one of the variants shuffling blocks of code within the computer program, the blocks including the at least one respective instruction for the one of the variants.

4. The computing device of claim 1, wherein a randomly selected transform applied to the computer program includes for at least one of the variants interleaving blocks of code within the computer program, the blocks including the at least one respective instruction for the one of the variants.

5. The computing device of claim 1, wherein a randomly selected transform applied to the computer program includes for at least one of the variants shuffling and interleaving blocks of code within the computer program, the blocks including the at least one respective instruction for the one of the variants.

6. A computing device, comprising:
a processor; and
a memory having a plurality of instructions stored thereon which, executed by the processor, cause the processor to generate semantically equivalent variants of a computer program by applying randomly selected transforms to the computer program, each of the variants including at least one respective instruction modified from the computer program, and further cause the processor to perform unit tests on the variants of the computer program to detect a defect in the computer program, including the processor executing the at least one respective instruction modified in each of the variants,
wherein a randomly selected transform applied to the computer program includes for at least one of the variants interleaving blocks of code within the computer program, the blocks including the at least one respective instruction for the one of the variants, and
wherein the blocks of code that are interleaved include a function call to a function that performs a computation for increasing runtime sufficiently to expose a race condition.

7. A system, comprising:
a computer program variant generator configured to generate diverse but semantically equivalent variants of a computer program by applying randomly selected transforms to the computer program, each of the variants including at least one respective instruction modified from the computer program;
a unit test generator configured to generate unit tests for the variants of the computer program; and
a tester configured to perform the unit tests on the variants of the computer program to detect a defect in the computer program, including execution of the at least one respective instruction modified in each of the variants.

8. The system of claim 7, wherein a randomly selected transform applied by the computer program variant generator includes, for one or more of the variants, at least one of inserting the respective instruction that specifies no operation into the computer program and inserting the at least one respective instruction, which is a plurality of instructions that has no functionality, into the computer program.

9. The system of claim 7, wherein a randomly selected transform applied by the computer program variant generator includes for at least one of the variants shuffling blocks of code within the computer program, the blocks including the at least one respective instruction for the one of the variants.

10. The system of claim 7, wherein a randomly selected transform applied by the computer program variant generator includes for at least one of the variants interleaving blocks of code within the computer program, the blocks including the at least one respective instruction for the one of the variants.

11. The system of claim 7, wherein a randomly selected transform applied by the computer program variant generator includes for at least one of the variants shuffling and interleaving blocks of code within the computer program, the blocks including the at least one respective instruction for the one of the variants.

12. A method, comprising:
generating a variant of a computer program that is semantically equivalent to the computer program by applying a randomly selected transform to the computer program, the variant including at least one respective instruction modified from the computer program;
generating a unit test for testing the variant of the computer program;
performing the unit test on the variant of the computer program, wherein a failure of the unit test by the variant detects a defect in the computer program; and
repeating each of the above steps for a prescribed number of variants and a prescribed number of unit tests, wherein the performing of one or more of the prescribed number of unit tests executes the at least one respective instruction modified in each of the prescribed number of variants.

13. The method of claim 12, further comprising generating a set of unit tests for each variant among the prescribed number of variants.

14. The method of claim 12, further generating a set of variants for each unit test among the prescribed number of unit tests.

15. The method of claim 12, further comprising logging a test result and the variant upon which the unit test is performed.

16. The method of claim 12, further comprising:
performing the unit test on the computer program;
determining the variant fails the unit test in response to a difference between an expected output of the variant for the unit test and an actual output of the variant for the unit test, wherein the expected output is an actual output from the performing the unit test on the computer program; and
responsive to the variant failing the unit test, logging the failure, the difference, and the variant upon which the unit test is performed.

17. The method of claim 12, wherein applying the randomly selected transform to the computer program includes inserting the respective instruction that specifies no operation into the computer program or inserting the at least one respective instruction, which is a plurality of instructions that has no functionality, into the computer program.

18. The method of claim 12, wherein applying the randomly selected transform to the computer program includes performing at least one of shuffling and interleaving blocks of code within the computer program, the blocks including the at least one respective instruction.

19. The method of claim 12, wherein the repeating of the step of the generating the unit test includes repeating the step of the generating the unit test for testing each one of the prescribed number of variants until measurement of test coverage determines that the at least one respective instruction has been executed during the repeating of the step of the performing the unit test on the one of the prescribed number of variants.

20. The method of claim 12, wherein the step of the generating the unit test for testing the variant includes generating the unit test including test inputs selected at random and test inputs selected in response to at least one decorator within the computer program.

* * * * *